(12) United States Patent
Duzly et al.

(10) Patent No.: US 10,296,260 B2
(45) Date of Patent: May 21, 2019

(54) METHOD AND SYSTEM FOR WRITE AMPLIFICATION ANALYSIS

(71) Applicant: SanDisk Technologies LLC, Plano, TX (US)

(72) Inventors: Yacov Duzly, Raanana (IL); Eyal Sobol, Givat Shmuel (IL); Tal Shaked, Hanna-Karkur (IL); Liat Hod, Kfar Saba (IL); Omer Gilad, Holon (IL); Zevulun Einat Inna, Kfar Saba (IL)

(73) Assignee: SanDisk Technologies LLC, Plano, TX (US)

( * ) Notice: Subject to any disclaimer, the term of this patent is extended or adjusted under 35 U.S.C. 154(b) by 114 days.

(21) Appl. No.: 15/347,565

(22) Filed: Nov. 9, 2016

(65) Prior Publication Data
US 2018/0129448 A1    May 10, 2018

(51) Int. Cl.
*G06F 3/06* (2006.01)
*G06F 12/02* (2006.01)
(Continued)

(52) U.S. Cl.
CPC .......... *G06F 3/0653* (2013.01); *G06F 3/0604* (2013.01); *G06F 3/0616* (2013.01);
(Continued)

(58) Field of Classification Search
CPC .... G06F 3/0679; G06F 3/0653; G06F 3/0688; G06F 12/0253; G06F 3/0604;
(Continued)

(56) References Cited

U.S. PATENT DOCUMENTS

| 2011/0191654 A1* | 8/2011 | Rub | H03M 13/05 |
| | | | 714/773 |
| 2014/0215125 A1* | 7/2014 | Sela | G06F 12/0292 |
| | | | 711/103 |

(Continued)

OTHER PUBLICATIONS

Micron, "Technical Note SMART Attribute: Calculating the Write Amplification Factor", Rev. A—Feb. 2014, Rev. B—Dec. 2014, 3 pages.

(Continued)

*Primary Examiner* — Hashem Farrokh
(74) *Attorney, Agent, or Firm* — Brinks Gilson & Lione

(57) ABSTRACT

A method and system for write amplification analysis are provided. In one embodiment, a method is provided that is performed in a computing device. The method comprises determining an amount of data written from the computing device to a storage system over a time period, wherein the storage system comprises a memory; determining an amount of data written to the memory by the storage system over the time period; calculating a write amplification factor over the time period; and simultaneously displaying graphs of the amount of data written from the computing device over the time period, the amount of data written to the memory over the time period, and the write amplification factor over the time period. Other embodiments are possible, and each of the embodiments can be used alone or together in combination.

22 Claims, 11 Drawing Sheets

(51) Int. Cl.
*G06F 11/30* (2006.01)
*G06F 11/32* (2006.01)

(52) U.S. Cl.
CPC ........ *G06F 3/0679* (2013.01); *G06F 11/3034* (2013.01); *G06F 12/0246* (2013.01); *G06F 11/324* (2013.01); *G06F 2212/7205* (2013.01)

(58) Field of Classification Search
CPC ........... G06F 3/0652; G06F 2212/2022; G06F 12/0238; G06F 2212/214; G06F 12/0246; G06F 2212/7205; G06F 11/3034; G06F 11/324; G06F 3/0616
USPC .......................................................... 711/103
See application file for complete search history.

(56) References Cited

U.S. PATENT DOCUMENTS

| | | | | |
|---|---|---|---|---|
| 2015/0006831 | A1* | 1/2015 | Keshavamurthy | G06F 12/0246 711/157 |
| 2015/0235709 | A1* | 8/2015 | Ohshima | G11C 16/16 365/185.11 |
| 2015/0268872 | A1* | 9/2015 | Ding | G06F 3/0616 711/103 |
| 2015/0288847 | A1* | 10/2015 | Sakuma | H04N 1/2195 358/1.13 |
| 2017/0123883 | A1* | 5/2017 | Hall | G06F 11/0754 |
| 2017/0131948 | A1* | 5/2017 | Hoang | G06F 3/0653 |
| 2017/0242592 | A1* | 8/2017 | Camp | G06F 3/0605 |

OTHER PUBLICATIONS

Xie et al., "Measuring and Analyzing Write Amplification Characteristics of Solid State Disks", 2013 IEEE 21$^{st}$ International Symposium on Modeling, Analysis & Simulation of Computer and Telecommunication Systems, pp. 212-221.
Pletka et al., "Write Amplification Analysis in Flash-Based Solid State Drives", 2009, IBM Zurich Research Laboratory, 9 pages.
Saleem, F., "Best Free Hardware Monitoring Tools for Windows PC Innov8tiv", Oct. 13, 2014, Retrieved from the Internet: http://innov8tiv.
Anonymous, "Open Hardware Monitor-Core Temp, Fan Speed and Voltages in a Free Software Gadget", Oct. 30, 2016, Retrieved from the Internet: https://web.archive.org/web/20161030002354/http://openhardwaremonitor.org/ [retrieved on Mov. 16, 2017].
Yoo, J. et al., "VSSIM: Virtual Machine Based SSD Simulator", *Mass Storage Systems and Technologies (MSST)*, 2013, pp. 1-14.
Williams, P. et al., "S.M.A.R.T. Monitoring Tools/Code/[r4352]/trunk/smartmontools/drivedb.h", Oct. 23, 2016, Retrieved from the Internet: https://sourceforge.net/p/smartmontools/code/4352/tree//trunk/smartmontools/drivedb.h#l12 [retrieved on Nov. 17, 2017].
Desnoyers, P., "Analytic Models of SSD Write Performance", *ACM Transactions on Storage, Association for Computing Machinery*, vol. 10, No. 2, Mar. 1, 2014, pp. 1-25.
International Search Report and Written Opinion in International Application No. PCT/US2017/050724, dated Nov. 29, 2017, 16 pages.

* cited by examiner

METHOD AND SYSTEM FOR WRITE AMPLIFICATION ANALYSIS

BACKGROUND

One metric used when designing a storage system is the write amplification factor. The write amplification factor is defined as the amount of data written to the memory of the storage system divided by the amount of data written by a host. A write amplification factor of one would be ideal as it would provide the best response time and promote high endurance of the memory. However, writing host data often comes with write overhead, such as writing control data in the memory for flash management and possibly relocating data from one pool of blocks to another. Various methods can be used to measure the write amplification factor.

DETAILED DESCRIPTION

Figure 1A:
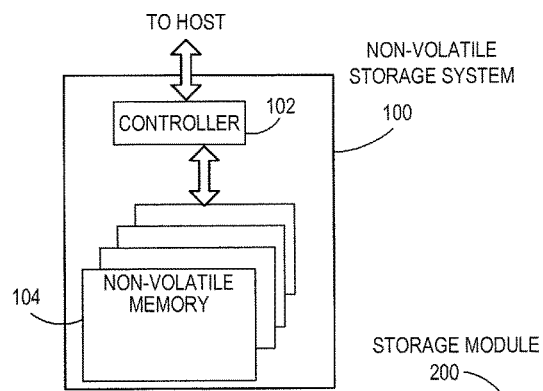
FIG. 1A is a block diagram of a non-volatile storage system of an embodiment.

By way of introduction, the below embodiments relate to a method and system for write amplification analysis. In one embodiment, a method is provided that is performed in a computing device. The method comprises determining an amount of data written from the computing device to a storage system over a time period, wherein the storage system comprises a memory; determining an amount of data written to the memory by the storage system over the time period; calculating a write amplification factor over the time period; and simultaneously displaying graphs of the amount of data written from the computing device over the time period, the amount of data written to the memory over the time period, and the write amplification factor over the time period.

In some embodiments, the method further comprises displaying a graph of consumed capacity over the time period.

In some embodiments, the method further comprises displaying a graph of over-provisioned blocks of the memory over the time period.

In some embodiments, the method further comprises displaying a graph of a size of control writes written over the time period.

In some embodiments, the method further comprises displaying a graph of relocation data over the time period.

In some embodiments, the amount of data written from the computing device over the time period is determined by monitoring a bus between the computing device and storage system for write commands.

In some embodiments, the amount of data written to the memory over the time period is determined by monitoring a bus between the memory and a controller of the storage system.

In some embodiments, the storage system is a simulation model of a storage system.

In some embodiments, the storage system is a real storage system.

In some embodiments, the method further comprises calculating an optimization function for a flash management algorithm in the storage system to reduce the write amplification factor.

In some embodiments, the memory comprises a three-dimensional memory.

In some embodiments, the storage system is embedded in a host.

In some embodiments, the storage system is removably connected to a host.

In another embodiment, a computing device is provided comprising means for gathering information about an amount of data written to a memory of a storage system over a time period and information about an amount of data written from a host to the storage system over the time period; and means for displaying graphical representations synchronized over the time period of activity in the storage system that contributes to the amount of data written to the memory of the storage system over the time period being more than the amount of data written from the host to the storage system over the time period.

In some embodiments, the memory comprises a three-dimensional memory.

In some embodiments, the storage system is an embedded storage system.

In some embodiments, the storage system is a removable storage system.

In another embodiment, a computer-readable storage medium storing computer-readable program code that, when executed by a processor, causes the processor to: collect information associated with a write amplification factor, wherein the information is collected over a time period for different write activities; generate graphs based on the information; and display the graphs together on a display device.

In some embodiments, the storage system comprises a three-dimensional memory.

In some embodiments, the storage system is embedded in a host.

In some embodiments, the storage system is removably connected to a host.

Other embodiments are possible, and each of the embodiments can be used alone or together in combination. Accordingly, various embodiments will now be described with reference to the attached drawings.

Figure 1B:
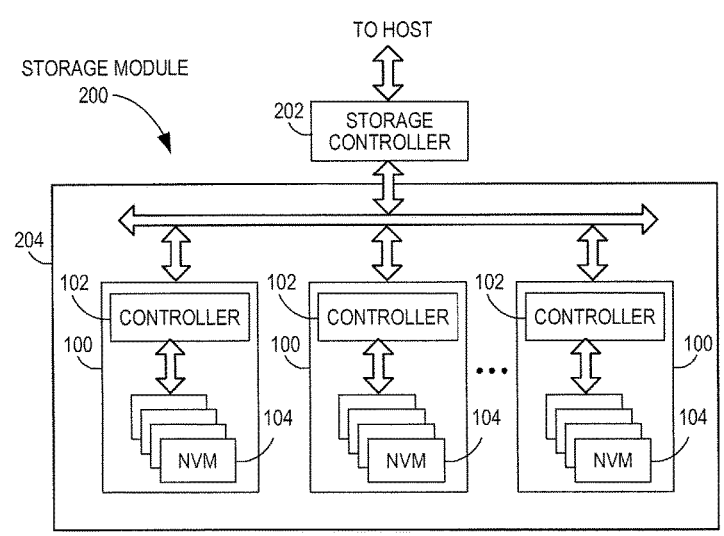
FIG. 1B is a block diagram illustrating a storage module of an embodiment.
Figure 1C:
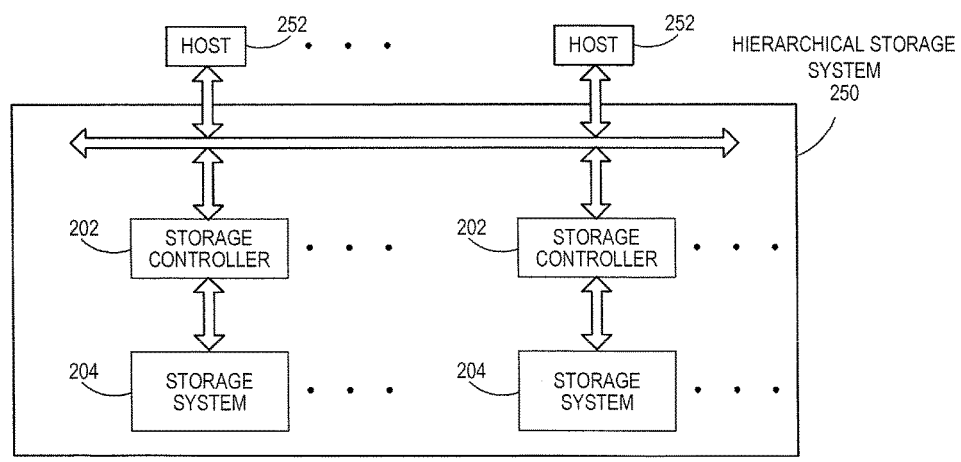
FIG. 1C is a block diagram illustrating a hierarchical storage system of an embodiment.

Turning now to the drawing, storage systems suitable for use in implementing aspects of these embodiments are shown in FIGS. 1A 1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. (The terms "memory" and "media" may be used interchangeably herein.) Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some NAND storage system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
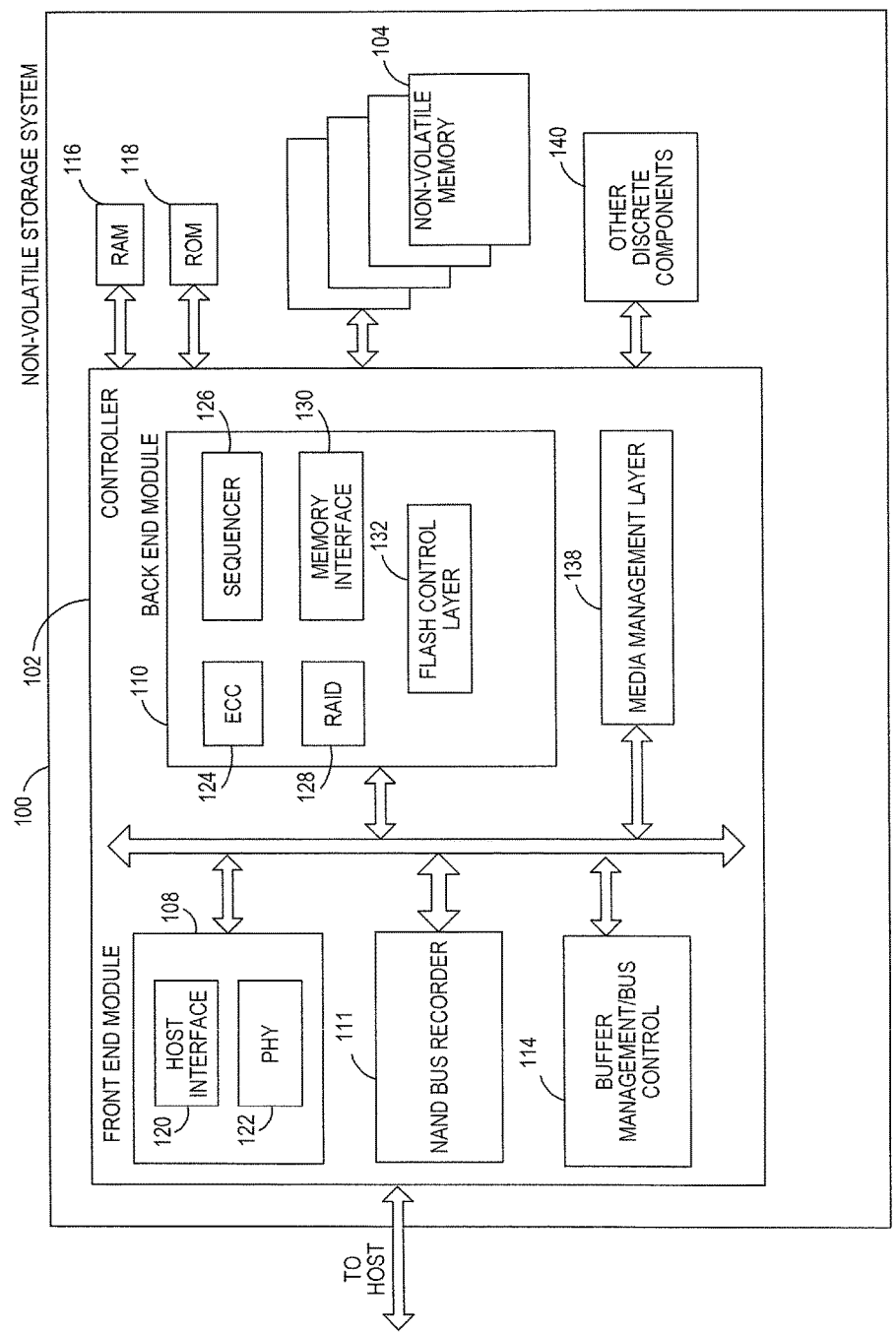
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. For example, in this embodiment, the controller 102 comprises a NAND bus recorder 111, which can be implemented in hardware or software/firmware and is configured to record traffic on the bus to the memory 104. The use of the NAND bus recorder 111 will be discussed in more detail below. Instead of or in addition to the NAND bus recorder 111 in the storage system 100, an external NAND bus monitor and/or an internal host bus monitor can be used. Also, in one embodiment, part of the computing element of write amplification is in the controller 102 of the storage system 100 (by using the NAND bus monitor and host bus monitor). A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
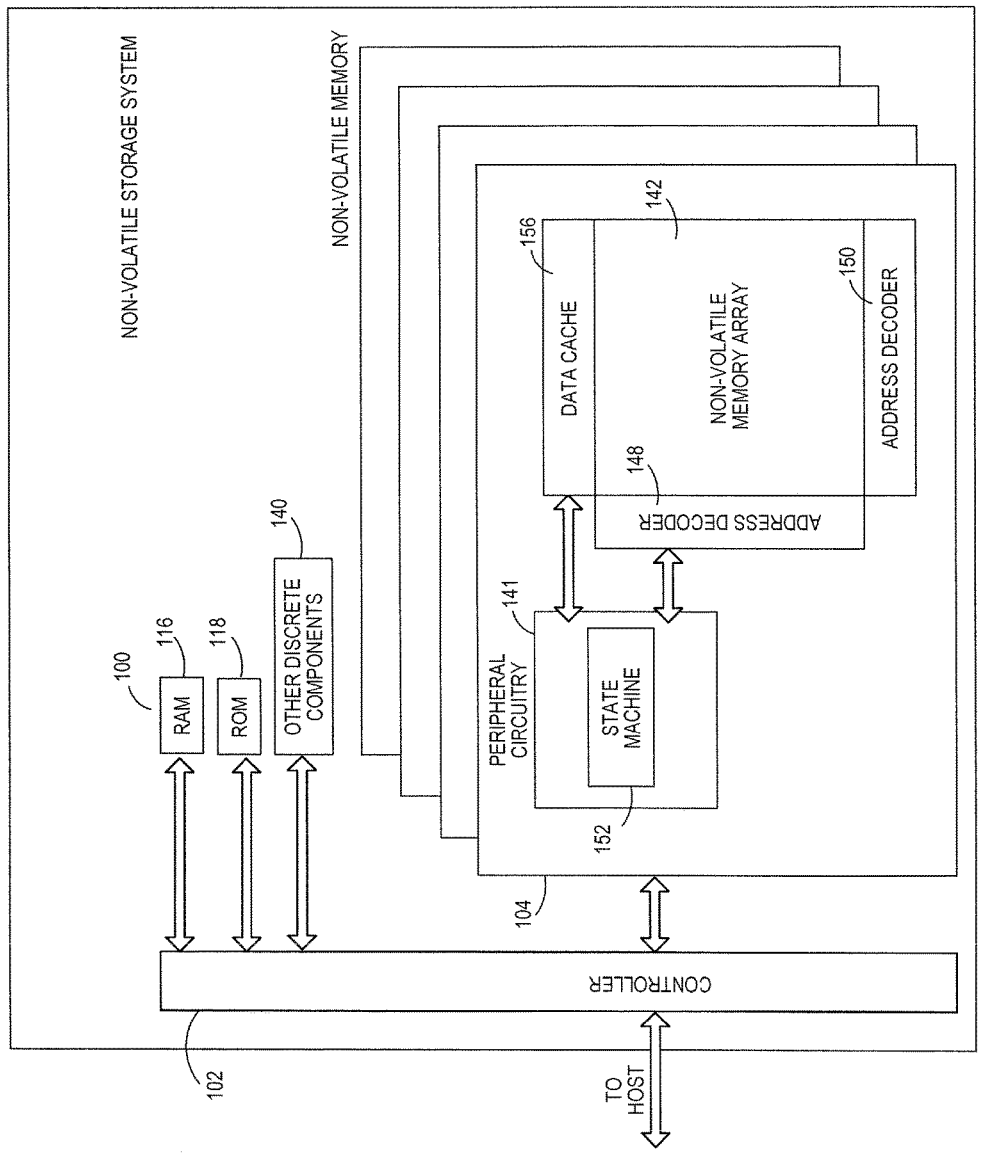
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Non-volatile memory die 104 further includes a data cache 156 that caches data.

As discussed above, one metric used when designing a storage system is the write amplification (WA) factor. The write amplification factor is defined as the amount of data written to the memory of the storage system divided by the amount of data written by a host. Expressed mathematically, the write amplification factor (WAF) is defined as:

$$WAF = \frac{\text{Amount of Data written to } NAND}{\text{Amount of Data written by Host}}$$

Figure 3:
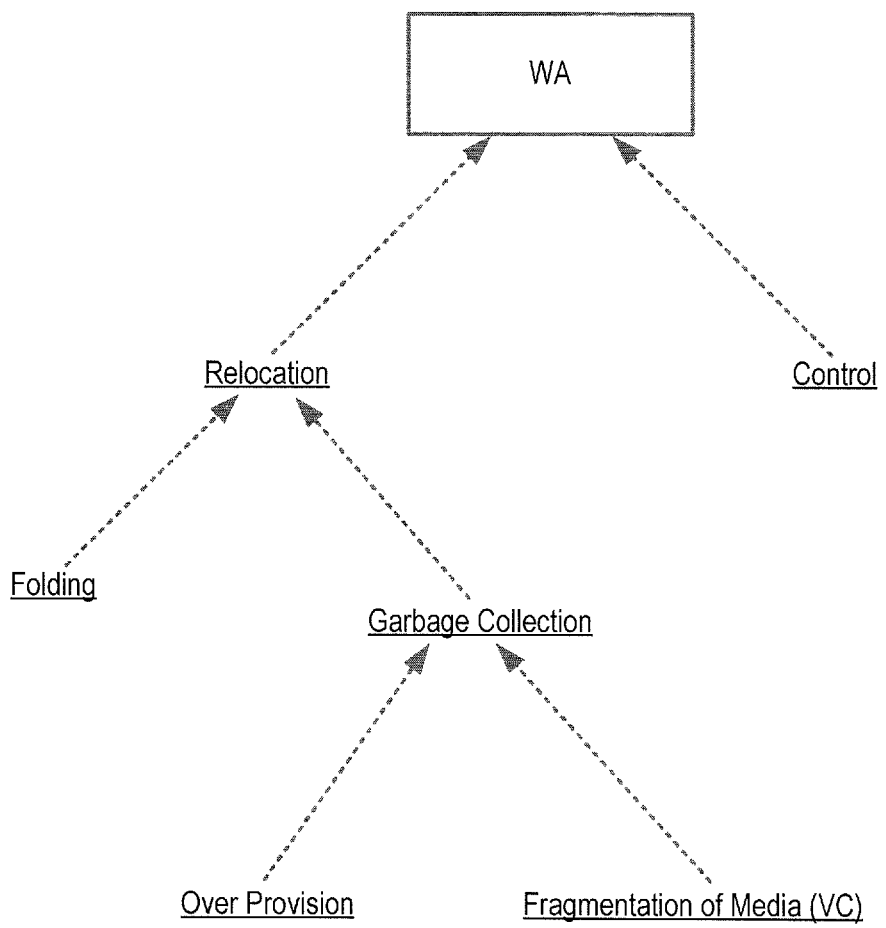
FIG. 3 is a diagram showing factors that can affect a write amplification factor of an embodiment.

A write amplification factor of one would be ideal as it would provide the best response time and promote high endurance of the memory. However, writing host data often comes with write overhead, and FIG. 3 shows some of the factors that can affect the write amplification factor. These factors include writing control data in the memory for flash management and possibly relocating data from one pool of blocks to another. As used herein, control data can refer to the additional writes required for data structures for flash management. The amount of control data written depends on the write scenario. For example, random writes on wide address ranges may require more frequent updates to the logical-to-physical address table than sequential writes.

Relocating data can take the form of folding or garbage collection. In one embodiment, folding refers to moving data from a block of single-level cells (SLC) to a block of multi-level or triple-level cells (MLC or TLC). In contrast, garbage collection refers to moving data between blocks of the same memory cell type (e.g., MLC to MLC, or TLC to TLC). As shown in FIG. 3, garbage collection can depend on overprovisioning (e.g., availability of free TLC/SLC blocks beyond the exported capacity of the memory). Overprovisioning can be determined by the amount of spare blocks at production time and also by the amount of blocks unmapped by the host and refers to how many spare blocks the system has for writing new incoming data. For example, when a host wants to write data to a block that already contains data, the storage system can write the incoming data to a spare block and then invalidate the old block in the logical-to-physical address table. If there were no spare blocks available in this scenario, the old data would need to be evacuated from the target block before the incoming host data could be written. This could lead to performance issues. Accordingly, the more spare blocks available in memory, the easier it is to accommodate random write scenarios.

Fragmentation of media is another vector under garbage collection and is measured by a metric referred to valid count (VC). Fragmentation occurs when there are blocks that are partially written because some of them were invalidated. A block that has a relatively-small amount of valid data is a good candidate for garbage collections because not much data needs to be moved. In contrast, if a 1 MB block has only 16 KB of invalid data, much more data would need to be moved, resulting in more write overhead.

Figure 4:
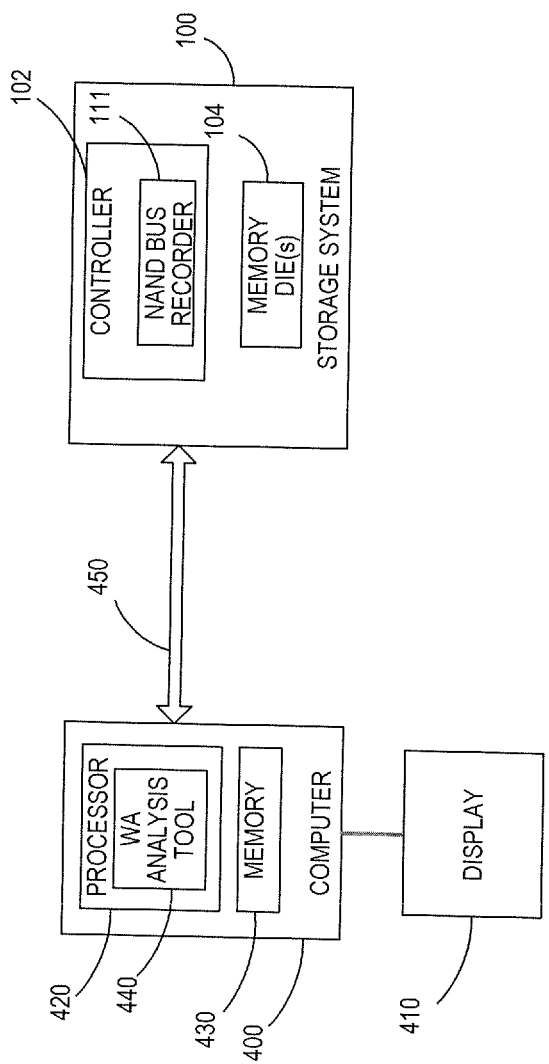
FIG. 4 is a block diagram of a system using a write amplification tool of an embodiment.

Returning again to the drawings, FIG. 4 is a block diagram of a system of an embodiment for calculating and analyzing a write amplification factor. As shown in FIG. 4, in this embodiment, a computer 400 (also referred to herein as a computing device) and display 410 are provided. These components can take any suitable form. For example, the computer 400 can be a personal computer or server, and the display 410 can be a stand-alone monitor. Alternatively, the computer 400 can be a mobile device that has the display 410 integrated in it (e.g., as a touch screen). Of course, these are merely examples, and other implementations can be used. For example, in an embodiment where part of the computing element of write amplification is in the controller 102 of the storage system (by using the NAND bus monitor and host bus), the computer 400 can just read the data and monitor it periodically.

The computer 400 in this embodiment comprises a processor 420 and a memory 430. The processor 420 is configured to implement a write amplification analysis tool 440. In one embodiment, computer-readable program code of the write amplification analysis tool 440 is stored in the memory 430 and is executed by the processor 420 (i.e., the write amplification analysis tool 440 can be software/firmware executed by hardware). In another embodiment, the write amplification analysis tool 440 is implemented exclusively in hardware. In any event, in one embodiment, the write amplification analysis tool 440 can be used to implement the algorithms shown in the attached flowcharts and described herein. In one embodiment, the write amplification analysis tool 440 can be used to perform write amplification analysis on a simulation of a storage system or can be used to perform write amplification analysis on an actual storage system 100 connected to the computer 400 by a bus 450. The computer 400 can also be used to generate and display terabytes written (TBW), which specifies how many terabytes can be written to the memory 104 until it cannot absorb any more data.

Figure 5:
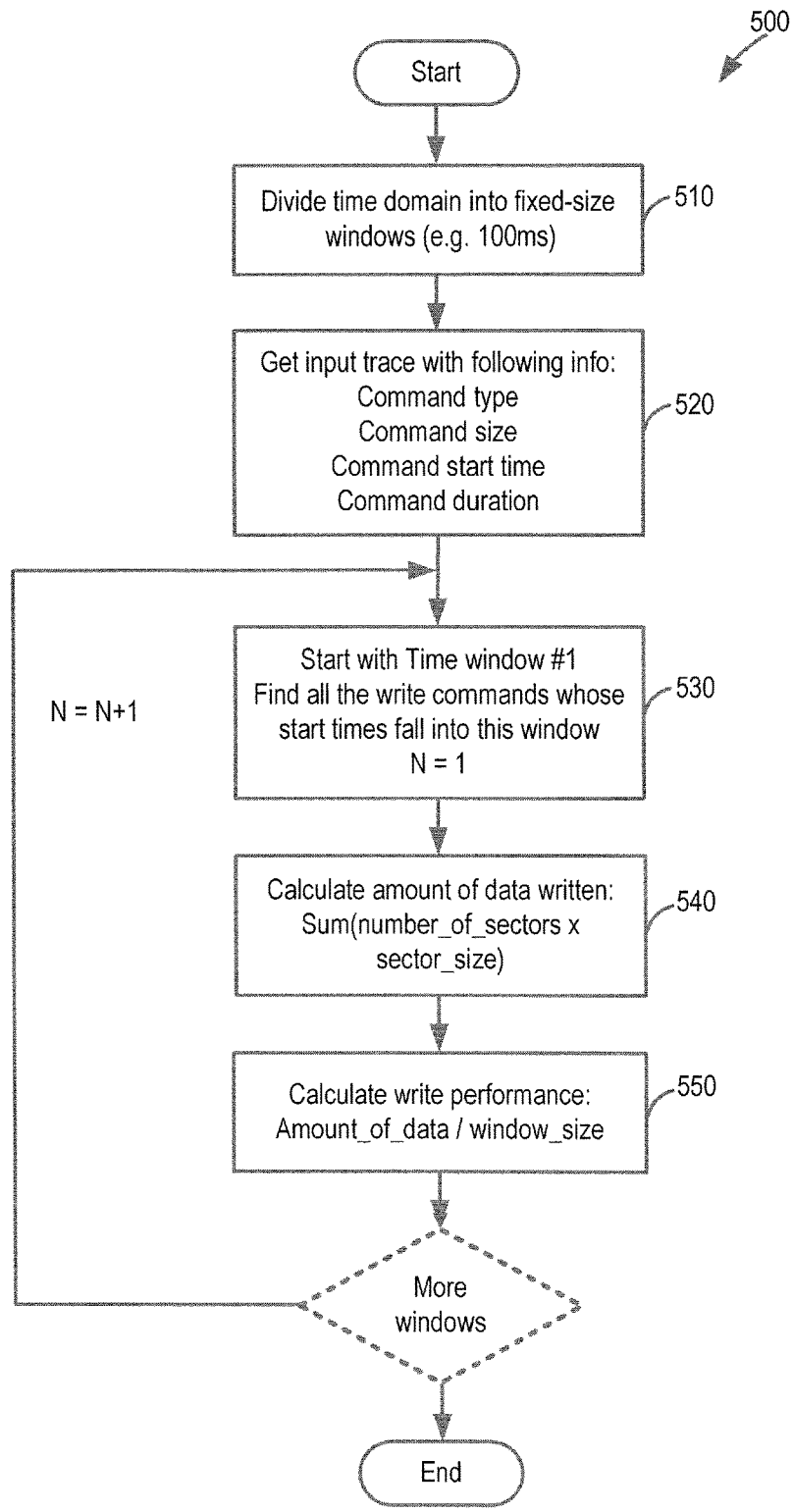
FIG. 5 is a flow chart of a method of an embodiment for measuring an amount of data written by a host.
Figure 6:
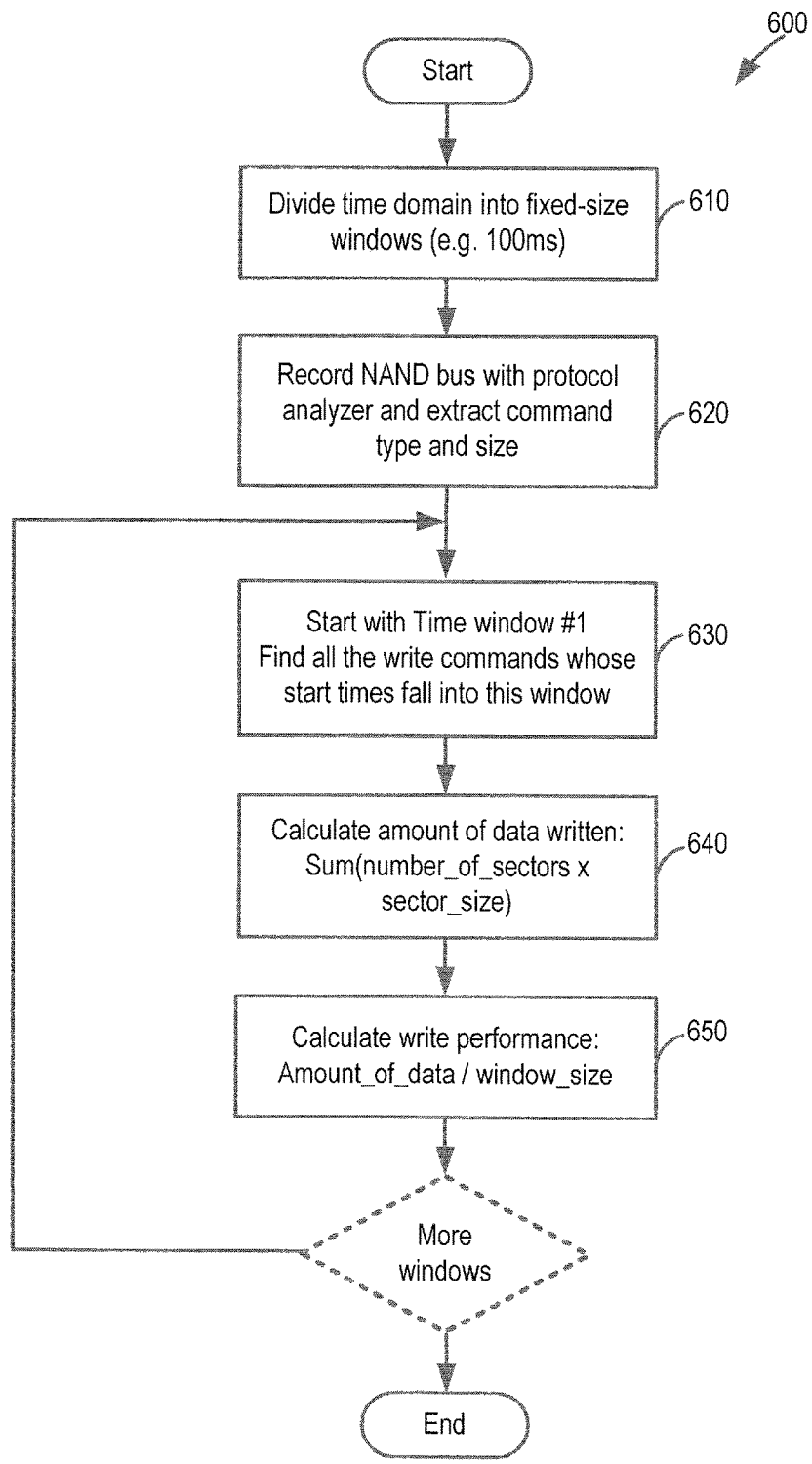
FIG. 6 is a flow chart of a method of an embodiment for measuring an amount of data written to a memory of a storage system.
Figure 7:
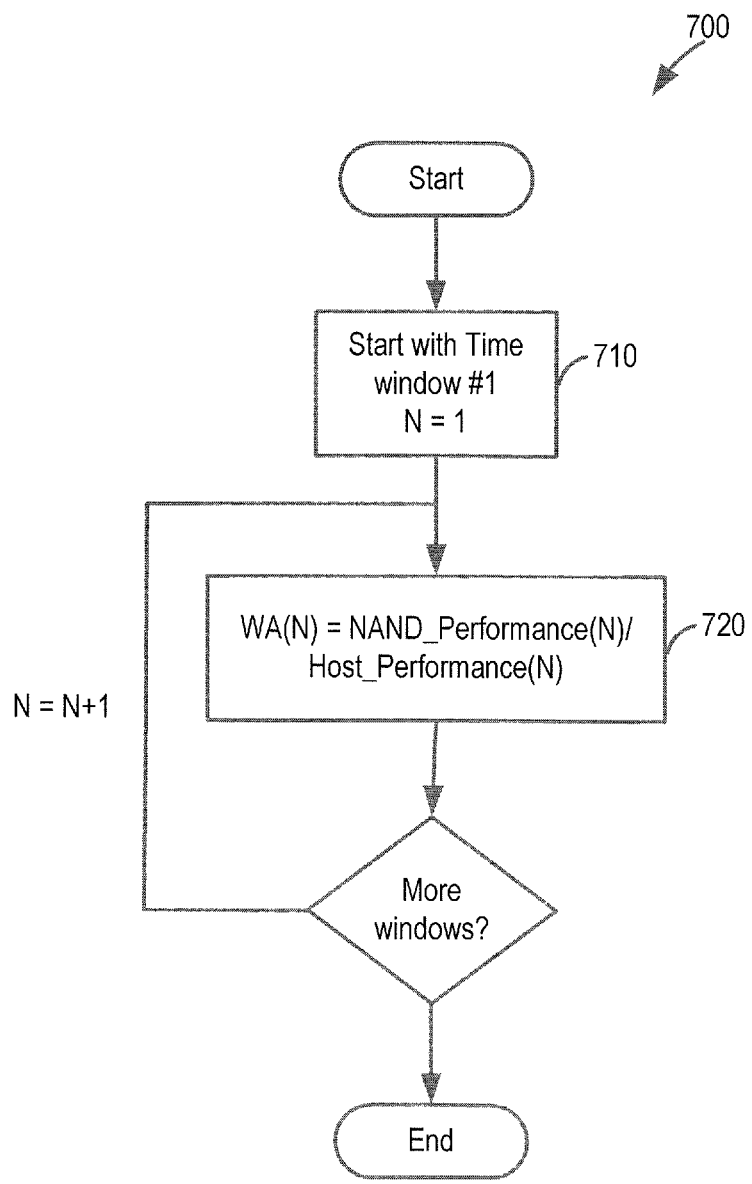
FIG. 7 is a flow chart of a method of an embodiment for calculating a write amplification factor.

Turning again to the drawings, FIGS. 5-7 are flow charts 500, 600, 700 of methods of an embodiment that can be used to calculate the write application factor. As discussed above, the underlying data to generate the write application factor is the amount of data written by a host and the amount of data written to the memory 104. Examples of methods that can be used to collect this data are shown in FIGS. 5 and 6, respectively.

Starting first with FIG. 5, FIG. 5 is a flow chart 500 of a method of an embodiment for measuring an amount of data written by a host (e.g., the computer 400 in FIG. 4). As shown in FIG. 5, the write amplification analysis tool 440 first divides the time domain into fixed window sizes (e.g., 100 ms) (act 510). Then, the write amplification analysis tool 440 monitors the bus 450 between the computer 400 and the storage system 100 to get an input trace with the following information: command type, command size, command start time, and command duration (act 520). Starting with time window #1, the write amplification analysis tool 440 finds all the write commands whose start times fall into this window (act 530). The write amplification analysis tool 440 then calculates the amount of data written by using the following formula: Sum(number_of_sectors×sector_size) (act 540). Then, the write amplification analysis tool 440 calculates the write performance by dividing the amount of data by the window size (act 550). The write amplification analysis tool 440 repeats these acts (530, 540, 550) for each window. After all the windows have been processed, the write amplification analysis tool 440 has measured the amount of data written by the computer 400.

As shown in the flow chart 600 in FIG. 6, the write amplification analysis tool 440 then measures the amount of data written to the memory 104 of storage system 100. While the measurement is taken on an actual storage system 100 in this example, as mentioned above, the analysis can be performed on a simulation. As shown in FIG. 6, in this embodiment, the write amplification analysis tool 440 divides the time domain into fixed-size windows (e.g., 100 ms) (act 610). The write amplification analysis tool 440 then receives input from the NAND bus recorder 111 and uses a protocol analyzer on the record activity on the NAND bus to extract command type and size (act 620). For example, the amount of data for control or relocation can be taken from NAND bus recorder 111, which occurs in parallel and is synchronized to the host activity, and address behavior can be taken from a recording utility in the host, such as FTrace.

Starting with time window #1, the write amplification analysis tool 440 finds all the write commands those start times fall into this window (act 630). The write amplification analysis tool 440 then calculates the amount of data written by using the following formula: Sum(number_of_sectors—sector_size) (act 640). Then, the write amplification analysis tool 440 calculates the write performance by dividing the amount of data by the window size (act 650). The write amplification analysis tool 440 repeats these acts (630, 640, 650) for each window. After all the windows have been processed, the write amplification analysis tool 440 has measured the amount of data written to the memory 104 of storage system 100.

Turning now to the flow chart in FIG. 7, to calculate the write amplification factor, the write amplification factor analysis tool 440 starts with time window #1 (act 710) can divides the NAND performance for that window (as determined in the flow chart 600 of FIG. 6) with the host performance of that window (as determined in the flow chart 500 of FIG. 5) (act 720). The write amplification factor analysis tool 440 repeats this process of the other windows.

Figure 8A:
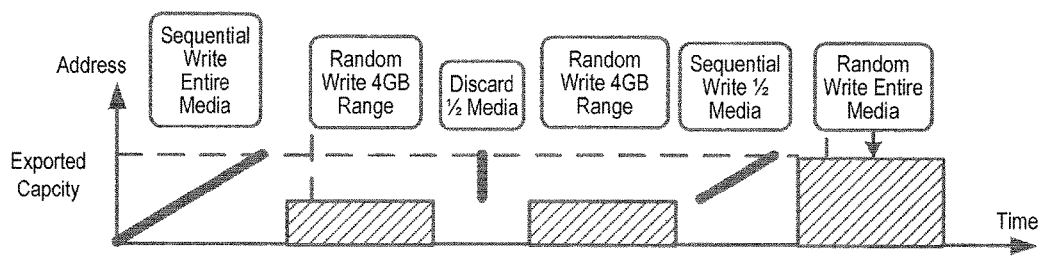
FIGS. 8A-8D are graphs generated and displayed by a write amplification tool of an embodiment.
Figure 8B:
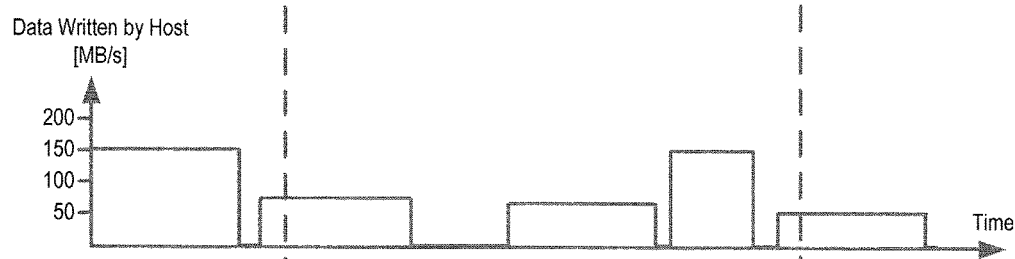
Figure 8C:
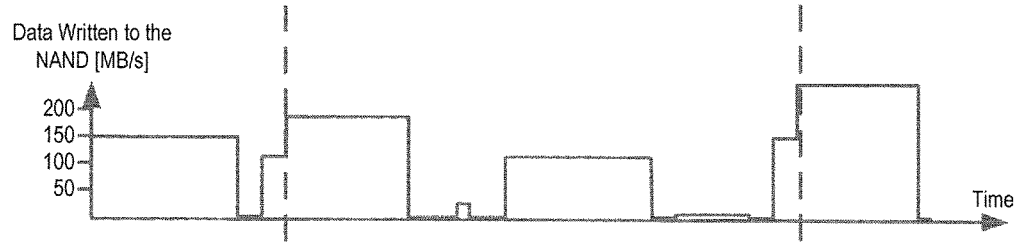
Figure 8D:
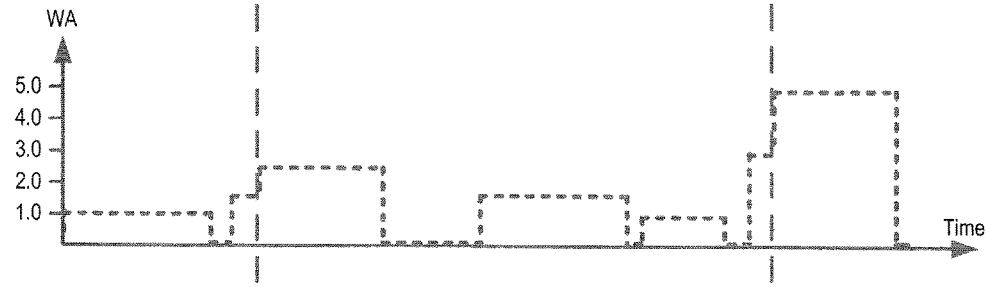

With this information now gathered, the write amplification factor analysis tool 440 can simultaneously display graphs on the display 410 of the amount of data written from the host, the amount of data written to the memory, and the write amplification value synchronized over the time period for various write scenarios, so a storage system designer can see the various effects on the write analysis factor over time. For example, FIG. 8A shows five different write and erase activities over time (sequential write over the entire media, random write on 4 GB, discard/unmap ½ the media, random write on 4 GB, sequential write over ½ the media, and random write over the entire media), and FIGS. 8B-8D shown the effect of those activities, over time, on measured data written by the host (FIG. 8B), measured data written to the NAND (FIG. 8C), and the calculated write amplification factor (FIG. 8D).

Of course the above graphs are merely examples, and different or other types of graphs can be used. Some of these additional graphs are shown in FIGS. 9A-9G.

Figure 9A:
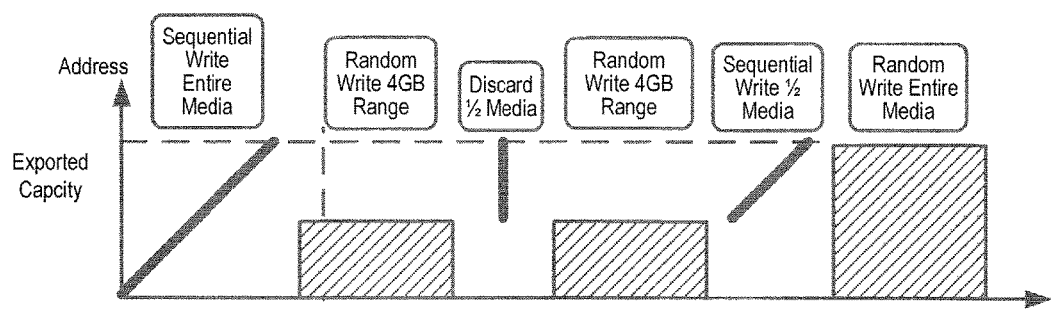
FIGS. 9A-9G are graphs generated and displayed by a write amplification tool of an embodiment.
Figure 9B:
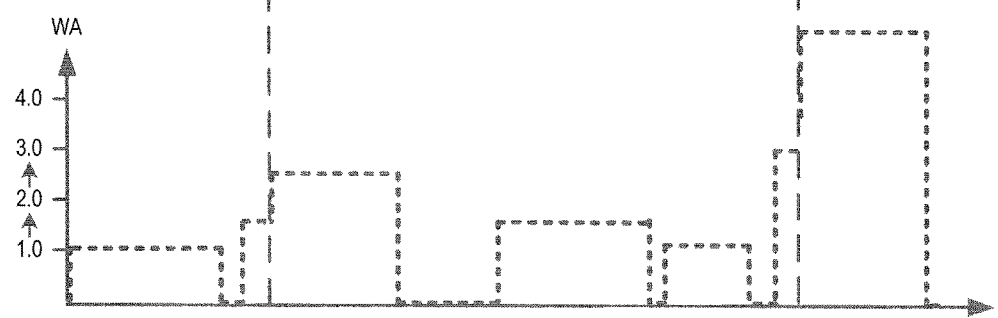
Figure 9C:
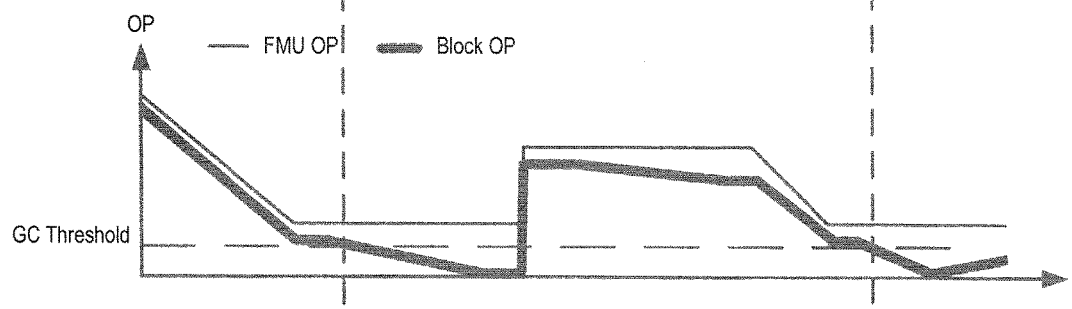
Figure 9D:
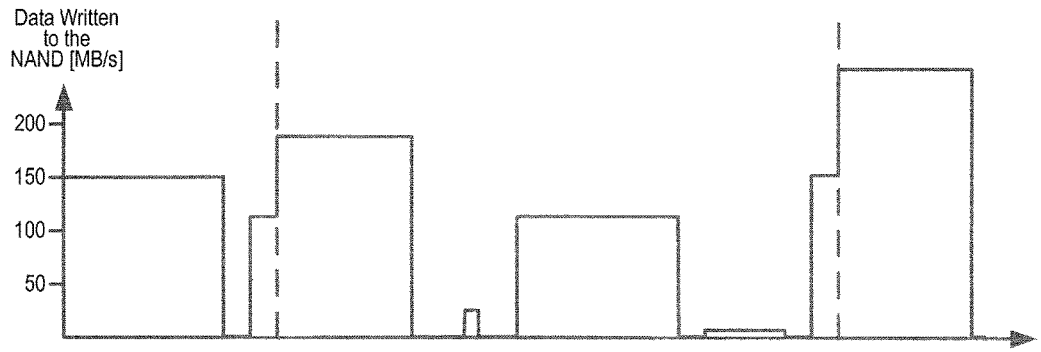
Figure 9E:
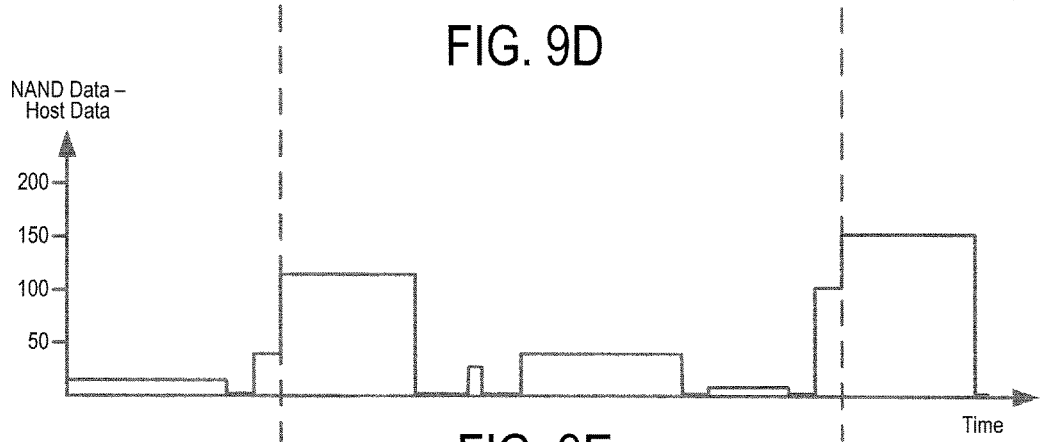
Figure 9F:
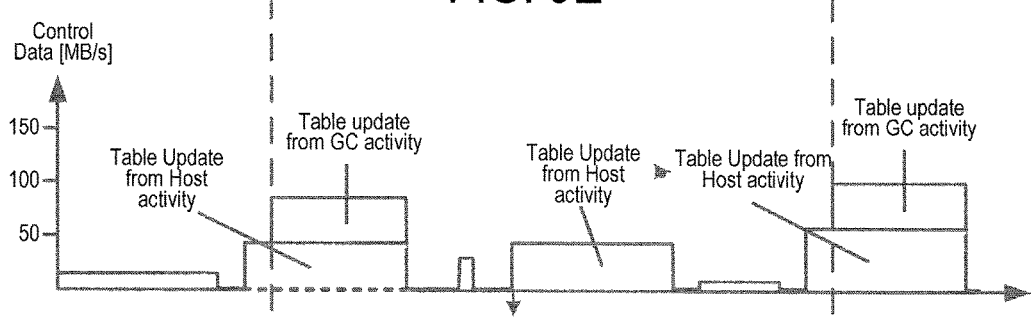
Figure 9G:
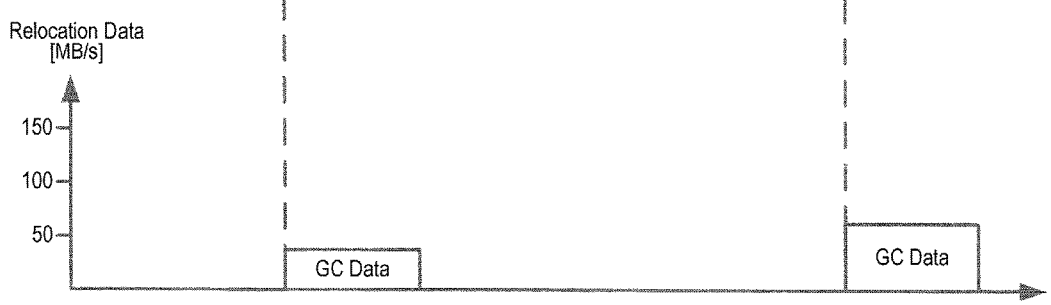

FIG. 9A shows the behavior over time of the commands in the address space. FIG. 9B (like FIG. 8D) shows the write amplification factor over time derived from all the factors discuss above. FIG. 9C shows overprovisioning both in terms of free blocks and flash management units (FMUs) (e.g., 4K bytes). In case of a random write, the amount of free FMUs stays the same, but the amount of available blocks may decrease over time until a garbage collection threshold is achieved, thus activating the garbage collection process. FIG. 9D shows data written to the NAND (like FIG. 8C). FIG. 9E shows NAND data—host data. FIG. 9F shows the excessive data generated only from control activity. As will be discussed below, sequential writes usually have very little control updates, while pure random writes generate much more table updates. Additional garbage collection generates even more control data. FIG. 9G shows relocation data when garbage collection is initiated.

As shown in these drawings, for a sequential write, data is written straight to the memory with sequential address (FIG. 9A) with a minimum amount of control data needed due to minimum updates to the logical-to-physical address table (FIG. 9F). Thus, as shown in FIG. 9B, the write amplification factor is almost 1, meaning that the amount of data written to the memory is almost all from the data written by the host. As shown in FIG. 9C, in this example, writing to the exported capacity of the entire media causes the overprovisioned flash management units (FMUs) and the overprovisioned blocks to reach a level just above the garbage collection threshold (i.e., the memory is filled to its exported capacity, and all that remains is a minimum level of spare blocks).

Next, for the random write in the 4 GB range, there is a jump up in the write amplification factor (FIG. 9B) because random writes would invalidate data in different blocks, and the logical-to-physical address table would need to be updated due to this host activity (FIG. 9F). However, as shown in FIG. 9C, part way into the random write, the number of overprovisioned blocks drops below the garbage collection threshold. This will cause the controller 102 to perform garbage collection and reallocate data from old blocks to new blocks (FIG. 9G), which will also cause the controller 102 to update the logical-to-physical address table from this garbage collection activity (FIG. 9F). Writing this extra control data due to garbage collection causes another jump up in the write amplification factor (FIG. 9B).

Next, the host sends a discards/unmap command (i.e., the address is not relevant) to half of the media. This means that, almost immediately, half of the exported capacity is available again for use, although the data in those blocks may or may not be erased (FIG. 9A), and there is a jump in the overprovisioning (FIG. 9C). Additionally, as shown in FIG. 9F, there is a small bump in the amount of control data due to an update in the logical-to-physical address table to make blocks as available.

Following the discard command, there is another random write in the 4 GB range. This time, because half the media is available for storage, the data can be written without triggering garbage collection. As such, the logical-to-physical address table only needs to be updated with host activity (and not with garbage collection activity, as in the prior random write), so the write amplification factor is less than that of the prior random write (FIG. 9F). Next, there is a sequential write to half the media. This is similar to the sequential write discuss earlier. Finally, there is a random write to the entire media. This is also similar to the random write discussed earlier, but, since there is more date being written now, the write amplification factor, control data, and relocation data have increased.

There are several advantages associated with these embodiments. For example, the write amplification factor analysis tool disclosed herein provides a powerful analysis tool that shows the dynamic behavior of write amplification and can cross correlate write amplification with other available information. This tool allows a storage system designer to analyze real use cases having a plethora of read, write, discard, flush, etc. operations in different sizes and addresses. Unlike prior methods that just generate a value for the write amplification factor, these embodiments allow a storage system designer to see the effect that real-life write use cases have over time on the write amplification factor by displaying graphs of various metrics simultaneously and synchronized to the same time scale.

Displaying all this information in a synchronized way in the same time scale shows the dynamic behavior of write amplification over time and in correlation with various input scenarios. For example, showing how much data is written by a host versus how much data is written to the memory of the storage system for various types of write activity can show the storage system designer when a problem occurs and why it is occurring. Using these graphs, the storage system designer can determine what adjustments to make to the flash management algorithm in the storage system 100 in order to improve or optimize the write amplification factor to improve response time and avoid reducing the endurance of the memory. As used herein, the "flash management algorithm" refers to the hardware, software, and/or firmware in the storage system 100 that controls the operation of the storage system 100, and, in particular, affects the relocation and control contributors to write amplification. That is, after looking at the various graphs, a storage system designer can modify the flash management algorithm to reduce the write amplification factor (e.g., the average or peaks) for various scenarios.

For example, as shown in the figures and discussed above, performing a random write of the entire media provides the worst write application factor. To reduce this, the storage system designer can change the structure of the logical-to-physical address table or change the policy of when that table is updated. In general, updating the table less often increase the risk of a loss-of-data if there is a sudden power loss. However, if a sudden power loss is unlikely, decreasing the amounts of table updates may be acceptable to improve performance. The write amplification factor analysis tool can also be configured to automatically or semi-automatically (e.g., with designer input) calculate an optimization function for the flash management algorithm to reduce the write amplification factor. For example, the write amplification analysis tool can be used to optimize the storage system's firmware code for folding, garbage collection, etc.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method comprising:
performing the following in a computing device:
determining an amount of data written from the computing device to a storage system over a time period for a plurality of write scenarios, wherein the storage system comprises a memory;
determining an amount of data written to the memory by the storage system over the time period for the plurality of write scenarios;
calculating a write amplification factor over the time period for the plurality of write scenarios; and
simultaneously displaying graphs of the amount of data written from the computing device over the time period for the plurality of write scenarios, the amount of data written to the memory over the time period for the plurality of write scenarios, and the write amplification factor over the time period for the plurality of write scenarios.

2. The method of claim 1 further comprising displaying a graph of consumed capacity over the time period.

3. The method of claim 1 further comprising displaying a graph of over-provisioned blocks of the memory over the time period.

4. The method of claim 1 further comprising displaying a graph of a size of control writes written over the time period.

5. The method of claim 1 further comprising displaying a graph of relocation data over the time period.

6. The method of claim 1, wherein the amount of data written from the computing device over the time period is determined by monitoring a bus between the computing device and the storage system for write commands.

7. The method of claim 1, wherein the amount of data written to the memory over the time period is determined by monitoring a bus between the memory and a controller of the storage system.

8. The method of claim 1, wherein the storage system is a simulation model of a storage system.

9. The method of claim 1, wherein the storage system is a real storage system.

10. The method of claim 1 further comprising calculating an optimization function for a flash management algorithm in the storage system to reduce the write amplification factor.

11. The method of claim 1, wherein the memory comprises a three-dimensional memory.

12. The method of claim 1, wherein the storage system is embedded in a host.

13. The method of claim 1, wherein the storage system is removably connected to a host.

14. The method of claim 1 further comprising:
receiving an adjustment to a memory management algorithm to reduce the write amplification factor for one of the plurality of write scenarios.

15. A computing device comprising:
means for gathering information about an amount of data written to a memory of a storage system over a time period for a plurality of write scenarios and information about an amount of data written from a host to the storage system over the time period for the plurality of write scenarios; and
means for simultaneously displaying graphical representations synchronized over the time period of activity in the storage system that contributes to the amount of data written to the memory of the storage system over the time period for the plurality of write scenarios exceeding the amount of data written from the host to the storage system over the time period for the plurality of write scenarios.

16. The computing device of claim 15, wherein the memory comprises a three-dimensional memory.

17. The computing device of claim 15, wherein the storage system is an embedded storage system.

18. The computing device of claim 15, wherein the storage system is a removable storage system.

19. A non-transitory computer-readable storage medium storing computer-readable program code that, when executed by a processor, causes the processor to:
collect information associated with a write amplification factor, wherein the information is collected over a time period for a plurality of different write activities;
generate graphs based on the information; and
simultaneously display the graphs on a display device.

20. The non-transitory computer-readable storage medium of claim 19, wherein the write activities are performed in a storage system comprising a three-dimensional memory.

21. The non-transitory computer-readable storage medium of claim 19, wherein the write activities are performed in a storage system embedded in a host.

22. The computer-readable storage medium of claim 19, wherein the write activities are performed in a storage system removably connected to a host.

* * * * *